United States Patent
Panchangam et al.

(10) Patent No.: US 11,594,144 B2
(45) Date of Patent: Feb. 28, 2023

(54) COLLISION AWARENESS USING CAMERAS MOUNTED ON A VEHICLE

(71) Applicant: Honeywell International Inc., Morris Plains, NJ (US)

(72) Inventors: Sunitha Panchangam, Bangalore (IN); Anoop Surendran, Bangalore (IN); Nathan Krishnamoorthy, Bangalore (IN); Lawrence J. Surace, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 202 days.

(21) Appl. No.: 16/778,109

(22) Filed: Jan. 31, 2020

(65) Prior Publication Data
US 2021/0241637 A1 Aug. 5, 2021

(51) Int. Cl.
*G08G 5/06* (2006.01)
*G06V 20/52* (2022.01)
(Continued)

(52) U.S. Cl.
CPC .............. *G08G 5/065* (2013.01); *B64D 45/00* (2013.01); *G06V 20/52* (2022.01); *G08G 5/04* (2013.01);
(Continued)

(58) Field of Classification Search
None
See application file for complete search history.

(56) References Cited

U.S. PATENT DOCUMENTS 4,293,857 A * 10/1981 Baldwin ............... G01S 13/933 342/38
6,118,401 A 9/2000 Tognazzini
(Continued)

FOREIGN PATENT DOCUMENTS

CA 2833985 A1 * 5/2014 ........... G05D 1/0083
EP 2892040 A1 * 7/2015 ........... G06F 3/0484
(Continued)

OTHER PUBLICATIONS

"ASN Aircraft accident Airbus A321-231 TC-JMM Istanbul-Ataturk International Airport (IST)," Flight Safety Foundation, www.flightsafety.org, Aviation Safety Network, Dec. 7, 2018, 3 pp.
(Continued)

*Primary Examiner* — Tyler W. Sullivan
(74) *Attorney, Agent, or Firm* — Shumaker & Sieffert, P.A.

(57) ABSTRACT

In some examples, a collision awareness system includes two cameras mounted on portions of a vehicle and processing circuitry configured to determine a position of an object based on an image captured by a first camera when the object is within a field of view of the first camera. The processing circuitry is further configured to determine the position of the object based on an image captured by a second camera when the object is within a field of view of the second camera. The processing circuitry is also configured to determine whether a distance between a future position of the vehicle and a current or future position of the object is less than a threshold level. In response to determine that the distance is less than the threshold level, the processing circuitry can generate an alert.

15 Claims, 8 Drawing Sheets

(51) Int. Cl.
*G08G 5/04* (2006.01)
*B64D 45/00* (2006.01)
G08G 5/00 (2006.01)
H04N 5/225 (2006.01)

(52) U.S. Cl.
CPC ............ *G08G 5/06* (2013.01); *G08G 5/0078* (2013.01); *H04N 5/2253* (2013.01)

(56) References Cited

U.S. PATENT DOCUMENTS

| | | | |
|---|---|---|---|
| 7,903,023 B2 | 3/2011 | Comic et al. | |
| 7,962,279 B2 | 6/2011 | Pepitone et al. | |
| 8,504,224 B2* | 8/2013 | Marty | G01C 23/00 340/964 |
| 8,509,965 B2* | 8/2013 | Lin | G01S 13/933 340/961 |
| 9,037,392 B2 | 5/2015 | Kirk et al. | |
| 9,047,771 B1 | 6/2015 | Thoreen et al. | |
| 9,575,174 B2 | 2/2017 | Vasek et al. | |
| 9,944,407 B2 | 4/2018 | O'Dell et al. | |
| 10,096,256 B2 | 10/2018 | Rutkiewicz et al. | |
| 10,102,760 B1 | 10/2018 | Foltan et al. | |
| 2003/0025614 A1* | 2/2003 | Kahn | G08G 5/0078 340/961 |
| 2008/0306691 A1 | 12/2008 | Louis et al. | |
| 2013/0321169 A1 | 12/2013 | Bateman et al. | |
| 2014/0142838 A1 | 5/2014 | Durand | |
| 2015/0106005 A1 | 4/2015 | Wischmeyer | |
| 2015/0269847 A1 | 9/2015 | Knight | |
| 2015/0329217 A1 | 11/2015 | Kirk et al. | |
| 2016/0264255 A1* | 9/2016 | Connor | H04N 5/247 |
| 2017/0113665 A1 | 4/2017 | Mudalige et al. | |
| 2017/0206436 A1* | 7/2017 | Schiffmann | G06K 9/6215 |
| 2019/0258878 A1* | 8/2019 | Koivisto | G06V 10/762 |
| 2020/0148203 A1* | 5/2020 | Taniguchi | G06T 1/00 |
| 2020/0202732 A1* | 6/2020 | Mecklem | G08G 5/0026 |
| 2021/0350715 A1* | 11/2021 | Liu | G08G 5/0021 |

FOREIGN PATENT DOCUMENTS

| | | |
|---|---|---|
| EP | 3301610 A1 | 4/2018 |
| EP | 3372508 A1 | 9/2018 |

OTHER PUBLICATIONS

Extended Search Report from counterpart European Application No. 21151465.8, dated Jun. 24, 2021, 10 pp.

Response to Extended European Search Report dated Jun. 24, 2021, from counterpart European Application No. 21151465.8, filed Nov. 2, 2021, 18 pp.

* cited by examiner

COLLISION AWARENESS USING CAMERAS MOUNTED ON A VEHICLE

TECHNICAL FIELD

This disclosure relates to collision awareness for vehicles.

BACKGROUND

Wingtip collisions during ground operations are a key concern to the aviation industry. Wingtip collisions are important because of the increased volume of aircraft at the space around airport terminals, the different kinds of airframes, and the increased surface occupancy in the space around airport terminals. The increased traffic and complexity creates safety risks, airport surface operational disruptions, and increased costs. Aircraft damage, even for slow-moving collisions, leads to expensive and lengthy repairs, which result in operational issues for air carriers. The risk of wingtip collisions increases as airlines upgrade their fleets because pilots are not accustomed to the larger wingspans and new wing shapes.

A vehicle can include a collision awareness system for detecting objects near the vehicle and predicting the likelihood of a collision between the vehicle and one of the objects. For example, aircraft include a collision awareness systems for alerting the flight crew of potential collisions such as wingtip collisions during ground operations. Some collision awareness systems use Global Navigation Satellite System (GNSS) to compute or alert wingtip collisions, but GLASS can have an error of approximately twenty feet or more.

SUMMARY

In general, this disclosure relates to systems, devices, and techniques for providing collision awareness to vehicle operators and crewmembers. A collision awareness system may include a plurality of cameras mounted at different positions on the vehicle. The collision awareness system also includes processing circuitry configured to determine a current position and/or velocity of an object based on one or more images captured by a first camera mounted on the vehicle in response to determining that the object is within the field of view of first camera. The processing circuitry is configured to determine the current position and/or velocity of the object based on one or more images captured by a second camera mounted on the vehicle in response to determining that the object is not within the field of view of first camera and is within the field of view of second camera. The processing circuitry can then determine whether a distance between the future position of the ownship aircraft and the current or future position of the object is less than a threshold level and generate an alert in response to determining that the distance is less than the threshold level.

In some examples, a collision awareness system can predict a collision between an ownship aircraft and a second aircraft during ground operations. The collision awareness system including a first camera mounted on a first portion of the ownship aircraft and a second camera mounted on a second portion of the ownship aircraft. The collision awareness system also includes processing circuitry configured to, in response to determining that the second aircraft is within a field of view of the first camera, determine a velocity of the second aircraft and a current position of the second aircraft based on one or more images captured by the first camera. The processing circuitry is also configured to, in response to determining that the second aircraft is within a field of view of the second camera and not within the field of view of the first camera, determine the velocity of the second aircraft and the current position of the second aircraft based on one or more images captured by the second camera. The processing circuitry is further configured to, in response to determining that the second aircraft is not within the field of view of the first camera or the field of view of the second camera, determine the current position of the second aircraft based on a surveillance message. The processing circuitry is configured to determine a future position of the second aircraft based on the velocity of the second aircraft and the current position of the second aircraft. The processing circuitry is also configured to determine that a distance between a future position of the ownship aircraft and the future position of the second aircraft is less than a threshold level and generate an alert in response to determining that the distance is less than the threshold level.

In some examples, a collision awareness method can predict a collision between an ownship aircraft and a second aircraft during ground operations. The collision awareness method includes determining, in a first instance, that the other aircraft is within a field of view of a first camera mounted on a first portion of the ownship aircraft. The method also includes determining, in the first instance and in response to determining that the second aircraft is within the field of view of the first camera, a velocity of the second aircraft and a current position of the second aircraft based on one or more images captured by the first camera. The method further includes determining, in a second instance, that the other aircraft is within a field of view of a second camera mounted on a second portion of the ownship aircraft and not within the field of view of the first camera. The method includes determining, in the second instance and in response to determining that the second aircraft is within the field of view of the second camera and not within the field of view of the first camera, the velocity of the second aircraft and the current position of the second aircraft based on one or more images captured by the second camera. The method also includes determining, in a third instance, that the second aircraft is not within the field of view of the first camera or the field of view of the second camera. The method further includes determining, in the third instance and in response to determining that the second aircraft is not within the field of view of the first camera or the field of view of the second camera, the current position of the second aircraft based on a surveillance message. The method includes determining a future position of the second aircraft based on the velocity of the second aircraft and the current position of the second aircraft. The method further includes determining that a distance between a future position of the ownship aircraft and the future position of the second aircraft is less than a threshold level and generating an alert in response to determining that the distance is less than the threshold level.

In some examples, a collision awareness system can predict a collision between an ownship aircraft and an object during ground operations. The collision awareness system includes a first camera mounted on a first portion of the ownship aircraft and a second camera mounted on a second portion of the ownship aircraft. The collision awareness system also includes processing circuitry configured to determine that the object is within a field of view of the first camera and determine a current position of the object based on one or more images captured by the first camera in response to determining that the object is within the field of view of the first camera. The processing circuitry is also configured to determine that the object is within a field of view of the second camera and not within the field of view of the first camera. The processing circuitry is further configured to determine the current position of the object based on one or more images captured by the second camera in response to determining that the object is within the field of view of the second camera and not within the field of view of the first camera. The processing circuitry is further configured to determine that a distance between a future position of the ownship aircraft and the current position of the object is less than a threshold level and generate an alert in response to determining that the distance is less than the threshold level.

The details of one or more examples of the disclosure are set forth in the accompanying drawings and the description below. Other features, objects, and advantages will be apparent from the description, drawings, and claims.

DETAILED DESCRIPTION

Various examples are described below for image processing, obstacle detection, and collision awareness for vehicles. A collision awareness system can use a plurality of cameras mounted on a vehicle to determine the current position of an object (e.g., another vehicle). The collision awareness system can use the plurality of cameras to determine the position of the object. For example, the collision awareness system can have a hierarchy of cameras, which may include a primary camera mounted on a first portion of the vehicle and a secondary camera mounted on a second portion of the vehicle. The collision awareness system can use the positions of the vehicle and the object to determine whether to generate an alert indicating a potential collision.

The techniques of this disclosure can be used on land vehicles, marine vehicles, and aircraft. In the context of an aircraft, a camera can be mounted on a protrusion of the aircraft such as the nose, tail, or wingtip of the aircraft. For example, a wingtip-mounted sensor can alert the vehicle operator to a potential wingtip collision, which is an important issue at airports. A collision awareness system of this disclosure can warn or alert a vehicle operator to avoid a potential collision, when the vehicle operator may not have been aware of the potential collision using other means such as line of sight or range sensors (e.g., radar or ultrasound). The collision awareness system may be especially useful in areas that are not well-monitored or well-lit, such as in fixed-based-operator areas and other ramp areas. The collision awareness system is also useful for predicting collisions between vehicles with long wingspans and/or high taxi speeds, and in low-visibility situations.

In some examples, a collision awareness system of this disclosure may be able to process images and detect objects using local processing circuitry co-located with a camera. Additional example details of using co-located processing circuitry to perform image processing can be found in commonly assigned U.S. patent application Ser. No. 16/252,945, entitled "Obstacle Detection Using Camera Mounted on Protrusion of Vehicle," filed on Jan. 21, 2019, which is incorporated by reference in its entirety.

Figure 1:
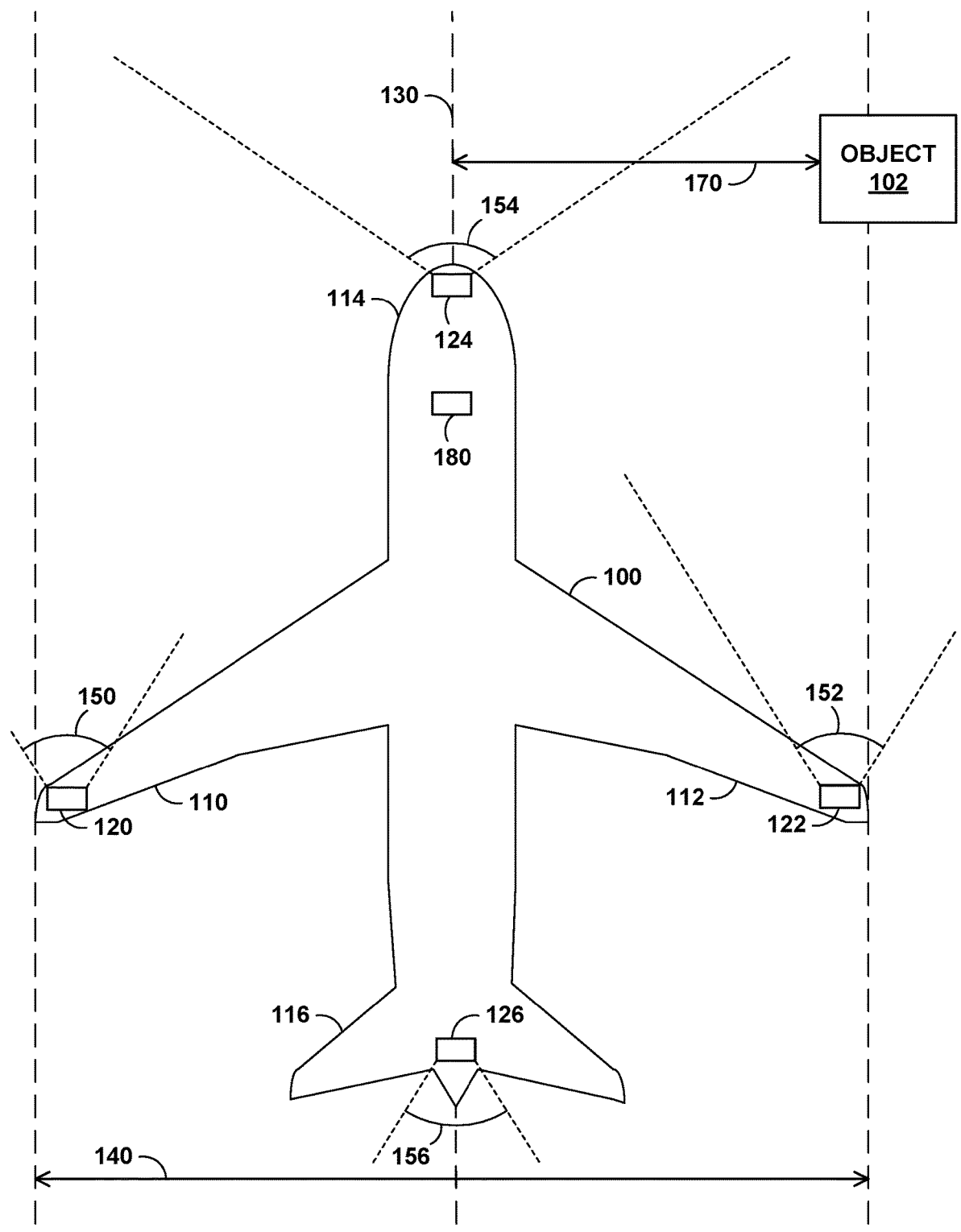
FIG. 1 is a diagram of cameras mounted at four locations on a vehicle, in accordance with some examples of this disclosure.

FIG. 1 is a diagram of cameras 120, 122, 124, and 126 mounted at four locations on a vehicle 100, in accordance with some examples of this disclosure. Cameras 120, 122, 124, and 126 may be part of a collision awareness system for detecting a potential collision between vehicle 100 and object 102. Processing circuitry 180 can use images captured by cameras 120, 122, 124, and/or 126 to determine the position of object 102 and determine whether to generate an alert.

Although vehicle 100 is depicted in FIG. 1 as an airplane, vehicle 100 may be any vehicle or mobile object. In some examples, vehicle 100 may be an aircraft such as an airplane, a helicopter, or a weather balloon, or vehicle 100 may be a space vehicle such as a satellite or spaceship. In yet other examples, vehicle 100 may include a land vehicle such as an automobile or a water vehicle such as a ship or a submarine. Vehicle 100 may be a manned vehicle or an unmanned vehicle, such as a drone, a remote-control vehicle, or any suitable vehicle without any pilot or crew on board.

Protrusions 110, 112, 114, and 116 are portions of vehicle 100. For example, protrusions 110, 112, 114, and 116 may include a corner, nose, tail, wingtip, wheel well, fin, vertical stabilizer, roof, bumper, fender, or any other protruding portion of vehicle 100. In some examples, each of protrusions 110, 112, 114, and 116 may include a power source, local processing circuitry, local memory, a transmitter, and/or a receiver to provide power to cameras 120, 122, 124, and 126.

Camera 120 is positioned on protrusion 110 (e.g., a wingtip of vehicle 100), camera 122 is positioned on protrusion 112 (e.g., a wingtip of vehicle 100), camera 124 is positioned on protrusion 114 (e.g., a nose of vehicle 100), and camera 126 is positioned on protrusion 116 (e.g., a tail of vehicle 100). Additionally or alternatively, one or more cameras may be mounted on other portions of vehicle 100, such as the fuselage of vehicle 100. Although vehicle 100 is shown as having four, vehicle 100 can have two, three, four, five, or any other number of cameras.

Cameras 120, 122, 124, and 126 can be positioned on or inside of vehicle 100. In some examples, cameras 120, 122, 124, and/or 126 are partially exposed to the environment outside vehicle 100, such that cameras 120, 122, 124, and/or 126 can capture images of the area surrounding vehicle 100. Cameras 120, 122, 124, and 126 can also be entirely inside of vehicle 100, where cameras 120, 122, 124, and 126 can capture images of the area surrounding vehicle 100 through a translucent surface of vehicle 100.

Cameras 120, 122, 124, and 126 can be mounted on vehicle 100 by physically attaching the components of cameras 120, 122, 124, and 126 to a portion of vehicle 100. Cameras 120, 122, 124, and 126 can be attached to vehicle 100 using tape, glue, other adhesives, screws, nails, fasteners, rivets, bolts, solder, welds, and/or any other type of attachment means. Cameras 120, 122, 124, and 126 can be attached inside of vehicle 100, outside of vehicle 100, on top of vehicle 100, underneath vehicle 100, and/or anywhere else on vehicle 100. In some examples, cameras 120, 122, 124, and 126 may not include radar, lidar, infrared detection, or ultrasonic sensors. Using only cameras may be more accurate and less expensive, as compared to using multiple means of detection, such as radar and ultrasound.

Cameras 120, 122, 124, and 126 may be configured to perform local (at protrusions 110, 112, 114, and 116) image processing techniques to determine the possibility of collision between vehicle 100 and object 102. Local processing circuitry can execute the image processing routines at protrusion 110 and transmit information using wired or wireless communication. The information may include captured images, information about object 102 such a position of object 102, and/or the time or distance to a potential collision with object 102.

Processing circuitry 180 can receive images and other information from cameras 120, 122, 124, and/or 126. Although processing circuitry 180 is shown positioned near the cockpit of vehicle 100, processing circuitry 180 can be positioned anywhere on vehicle 100. Processing circuitry 180 can be distributed across multiple locations in vehicle 100. For example, multiple processors positioned throughout vehicle 100 can be communicatively coupled to a network for predicting a collision between vehicle 100 and object 102. In some examples, processing circuitry 180 can be positioned partial or fully outside of vehicle 100 such as in a traffic control center or in another vehicle.

Processing circuitry 180 can perform obstacle detection and provide collision awareness based on images captured by cameras 120, 122, 124, and/or 126. Processing circuitry 180 may be configured to determine whether vehicle 100 will potentially collide with object 102. Processing circuitry 180 may be configured to assess the threat level of object 102. Responsive to determining that there may be a collision with object 102, processing circuitry 180 may generate an alert. Processing circuitry 180 may be configured to present information to the operator and/or crew of vehicle 100 indicating a potential collision between vehicle and object 102. For example, processing circuitry 180 can present the distance between a point on vehicle 100 and object 102 or an estimated time to collision.

Processing circuitry 180 may include any suitable arrangement of hardware, software, firmware, or any combination thereof, to perform the techniques attributed to processing circuitry 180 herein. Examples of processing circuitry 180 include any one or more microprocessors, digital signal processors (DSPs), application specific integrated circuits (ASICs), field programmable gate arrays (FPGAs), or any other equivalent integrated or discrete logic circuitry, as well as any combinations of such components. When processing circuitry 180 includes software or firmware, processing circuitry 180 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, processing circuitry 180 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to processing circuitry 180 (e.g., may be external to a package in which processing circuitry 180 is housed).

Processing circuitry 180 may be configured to determine a distance between a point on vehicle 100 and object 102 based on the image. Processing circuitry 180 may first determine the position of object 102 relative to one of cameras 120, 122, 124, and 126. In the example shown in FIG. 1, object 102 is within field of view 152 of camera 122, so processing circuitry 180 can use image processing techniques to determine the position of object 102 relative to camera 122. Processing circuitry 180 may be configured to process images captured by camera 122 at a rate of twenty or thirty frames per second. In some examples, processing circuitry 180 can determine the distance based on a single-camera detection technique. For example, processing circuitry 180 can determine an azimuth angle, an elevation angle, and a range of object 102 based on the image. Processing circuitry 180 may be configured to determine the azimuth angle and the elevation angle based on the orientation of camera 122 (e.g., the direction that camera 122 is pointing).

Processing circuitry 180 can determine the distance or range between camera 122 and object 102 using image processing techniques. For example, processing circuitry 180 can determine the range of a line or other symbol on a road, runway, taxiway, or another surface based on a known length or size of the symbol. In examples in which object 102 is positioned near a symbol on a surface, processing circuitry 180 can determine a distance to object 102 based on the determined distance to the symbol. Processing circuitry 180 can use other landmarks or known distances in the image to determine the distance between camera 122 and object 102. In some examples, local processing circuitry co-located with camera 122 on protrusion 112 can perform all of the image processing to determine the position of object 102. Additionally or alternatively, some or all of the image processing can be performed by central processing circuitry positioned in the vehicle control center (e.g., the cockpit of vehicle 100).

Based on the position of object 102 relative to camera 122, processing circuitry 180 can determine the position of object 102 relative to a point on vehicle 100. The point on vehicle 100 may be on protrusion 110 or 112, or the point may be at another location on vehicle 100. The point may also be an imaginary point or line such as a centerline of vehicle 100 or a plane aligned with an edge of vehicle 100. Processing circuitry 180 may be configured to determine the position of object 102 relative to the point on the vehicle 100 based on the position of object 102 relative to camera 122 and further based on the position of camera 122 relative to the point on the vehicle.

Processing circuitry 180 may be configured to determine that the distance between the point on vehicle 100 and object 102 is less than a threshold level. The threshold level can represent or be equal to a width, length, height, clearance, radius, or wingspan of vehicle 100. In some examples, the threshold level may represent a time or distance to collision between vehicle 100 and object 102. Processing circuitry 180 may be configured to compare the distance between the point on vehicle 100 and object 102 to more than threshold level, where each threshold level represents a different likelihood of collision or a different threat level.

Processing circuitry 180 may be configured to generate a prognostic alert in response to determining that the distance between the point on vehicle 100 and object 102 is less than the threshold level. Processing circuitry 180 can first determine the future positions of vehicle 100 and object 102 and then generate an alert in response to determining that a distance between vehicle 100 and object 102 is less than a threshold level. Processing circuitry 180 can also encode other information into the signal such as a threat level of object 102, a distance between object 102 and a point on vehicle 100, a distance between object 102 and camera 122, an estimated time to collision between vehicle 100 and object 102, an estimated distance to collision between vehicle 100 and object 102, and/or any other information.

Processing circuitry 180 can determine the current position of vehicle 100 using Global Navigation Satellite System (GNSS), an inertial navigation system (INS) or inertial reference system (IRS), and/or any other system for determining the position of a vehicle. In some examples, processing circuitry 180 can determine the position of object 102 relative to vehicle 100 without determining an absolute position of vehicle 100. Processing circuitry 180 may be configured to determine a velocity of vehicle 100 based on data from GNSS and/or INS. Processing circuitry 180 can determine a future position of vehicle 100 based on the current position of vehicle 100, the velocity of vehicle 100, and/or a current or future maneuver of vehicle 100.

For example, processing circuitry 180 can determine a current or future maneuver based on a map of roadways, taxiways, an airport, and/or shipping lanes. Processing circuitry 180 can also use communication between vehicle 100 and a traffic controller to determine a maneuver of vehicle 100. Processing circuitry 180 can use a predetermined route or destination for vehicle 100 to determine a maneuver of vehicle 100.

Cameras 120, 122, 124, and 126 are configured to capture images within the respective fields of view 150, 152, 154, and 156. Cameras 120, 122, 124, and 126 may be capable of capturing visible-light images and/or infrared images. Cameras 120, 122, 124, and 126 can be coupled to processing circuitry 180 such that processing circuitry 180 receives the images captured by cameras 120, 122, 124, and 126. For example, local processing circuitry may be coupled to the same printed circuit board (PCB) as one of cameras 120, 122, 124, and 126 to allow communication between the local processing circuitry and the respective camera. Cameras 120, 122, 124, and 126 can have a stationary field of view (e.g., stationary with respect to vehicle 100) or a rotating field of view.

Fields of view 150 and 152 for cameras 120 and 122 mounted on wing protrusions 110 and 112 may be fifty degrees. In some examples, fields of view 150 and 152 may be less than ninety degrees or less than seventy degrees. Field of view 154 may be one hundred and twenty degrees. In some examples, field of view 154 may be greater than ninety degrees or greater than one hundred degrees to provide a greater field of view for camera 124 mounted on nose protrusion 114. Nose camera 124 can detect objects in front of vehicle 100, wingtip camera 120 and 122 can detect objects to the sides of vehicle 100, and tail camera 126 can detect objects behind vehicle 100. Nose camera 124 may include an enhanced flight vision system (EVS) camera. The EVS camera may be an infrared camera, in some example.

Images and/or other information can be transmitted from cameras 120, 122, 124, and 126 to processing circuitry 180 using Wi-fi, Bluetooth, radio communication, infrared, Wireless Avionics Intra-Communications (WAIC), wired communication, and/or any other transmission protocol. In the simplest form, a single bit of information (e.g., a potential collision or no potential collision) can be transmitted from a camera to processing circuitry 180. Additionally or alternatively, transmitted information can include as the distance between object 102 and the point on vehicle 100, the distance between object 102 and the respective camera, an estimated time to collision between vehicle 100 and object 102, any other information relating to object 102, and/or any other information relating an image captured by the respective camera.

Object 102 can be a physical structure that can collide with vehicle 100. For example, object 102 may be a ground obstacle, such as another vehicle, a building, a sign, a light pole, a terrain feature (e.g., hill, slope, etc.), a plant such as a tree, a person, and/or any other ground object. Object 102 can also be an airborne obstacle, such as a bird or bat, an unmanned aerial vehicle, another flying vehicle, and/or any other airborne object. Object 102 may also be a water-based obstacle, such as a boat, a rock, a floating object, and/or any other water-based object.

In accordance with the techniques of this disclosure, processing circuitry 180 can determine whether object is in field of view 150, 152, 154, and/or 156 of cameras 120, 122, 124, and 126. Processing circuitry 180 can determine the current position of object 102 based on images captured by cameras 120, 122, 124, and 126 in response to determining whether object is in field of view 150, 152, 154, and/or 156. There may be a hierarchy of cameras such that processing circuitry 180 is configured to determine the current position of object 102 based on images captured by camera 124 in response to determining that object 102 is within field of view 154 because camera 124 (e.g., the nose camera) may be the primary camera.

In some examples, cameras 120 and 122 (e.g., the wingtip cameras) have second-level priority such that the processing circuitry 180 may be configured to determine the current position of object 102 based on images captured by camera 120 or 122 in response to determining that object 102 is not within field of view 154 and is within field of view 150 or 152. Camera 126 may have third-level priority such that the processing circuitry 180 may be configured to determine the current position of object 102 based on images captured by camera 126 in response to determining that object 102 is not within fields of view 150, 152, or 154 and is within field of view 156. Any other hierarchy of priority can be used.

In examples in which object 102 is within multiple fields of view, processing circuitry 180 can fuse images captured by multiple cameras to determine the current position of object 102. In examples in which processing circuitry 180 determines that object 102 is not within field of view 150, 152, 154, or 156, processing circuitry 180 can use other means for determining the current position of object 102, such as a surveillance message received from object 102, radar returns for object 102, a map or database indicating the current position of object 102, and/or any other means for determining the current position of object 102. Example protocols for surveillance messages include automatic-dependent surveillance-broadcast, traffic collision avoidance system, controller pilot data link communications, and automatic identification system.

Processing circuitry 180 may be configured to determine distance 170 between object 102 and centerline 130. Centerline 130 may be a two-dimensional plane that bisects vehicle 100. Processing circuitry 180 can compare distance 170 to a threshold level, which may be equal to or based on wingspan 140 (e.g., the width of vehicle 100). For example, the threshold level may be greater than or equal to one half of wingspan 140 of vehicle 100. In some examples, processing circuitry 180 is configured to generate an alert in response to determining that distance 170 or a future distance between object 102 and centerline 130 is less than the threshold level. Thus, processing circuitry 180 may be configured to suppress the transmission of an alert signal in response to determining that distance 170 is greater than the threshold level.

Additional example details of wingtip sensors can be found in commonly assigned U.S. Pat. No. 9,575,174, entitled "Systems and Methods for Filtering Wingtip Sensor Information," which issued on Feb. 21, 2017, and commonly assigned U.S. Patent Application Publication No. 2013/0321169, entitled "Airport Surface Collision-Avoidance System (ASCAS)," filed on Dec. 10, 2012, both of which are incorporated by reference in their entirety.

Processing circuitry 180 may be configured to determine a future position of object 102 based on the current position and velocity of object 102. Processing circuitry 180 can determine the velocity of object 102 based on communication received from object 102 and/or a change in the position of object 102 over time. Processing circuitry 180 can project the velocity of object 102 forward in time to determine the future position of object 102.

Processing circuitry 180 may be configured to determine a distance between the future positions of vehicle 100 and object 102. Processing circuitry 180 may be configured to also determine whether a distance between the future positions of vehicle 100 and object 102 is less than a threshold level. Responsive to determining that the distance is less than the threshold level, processing circuitry 180 can generate an alert.

Using a hierarchy of cameras and image processing, processing circuitry 180 may be able to determine the location of object 102 with a high degree of accuracy. Processing circuitry 180 can set nose camera 124 as the primary camera because camera 124 may have good visibility of the area ahead of vehicle 100. Processing circuitry 180 can set other cameras as secondary cameras in case the other cameras have less visibility over other areas around vehicle 100. Thus, the determination of the distance between vehicle 100 and object 102 may be based on the most accurate images captured by cameras 120, 122, 124, and 126. Another collision awareness system that uses GNSS data may have an error of approximately twenty feet or more, Another collision awareness system may also use radar on a protrusion of a vehicle, with or without a camera. Adding radar or ultrasonic sensors to the protrusion can result in additional weight and cost to the system. Thus, a collision awareness system of this disclosure may be more accurate and less expensive than a system that relies on GPS and/or radar.

The techniques of this disclosure can be used for any type of vehicle, such as an automobile, a marine vehicle, or an aircraft. However, the techniques of this disclosure may be especially well-suited for aircraft conducting ground operations at an airport. Even though aircraft move at relatively slow speeds (e.g., less than twenty miles per hour) during ground operations, it may be difficult for the flight crew to predict a potential collision that involves a protrusion of the aircraft (e.g., nose, wingtip, or tail). The length and wingspan of commercial aircraft can exceed two hundred feet, making it difficult for the flight crew to use line of sight to predict a collision. Helicopters and military aircraft have even more unusual shapes and protrusions, which also make collision prediction by line of sight difficult. The large mass of aircraft means that stopping distances can be tens of feet, and reaction times by flight crew add to the stopping distance. Moreover, airports are becoming more crowded as air travel increases. Thus, flight crew can benefit from advance warning to avoid a potential collision.

Figure 2:
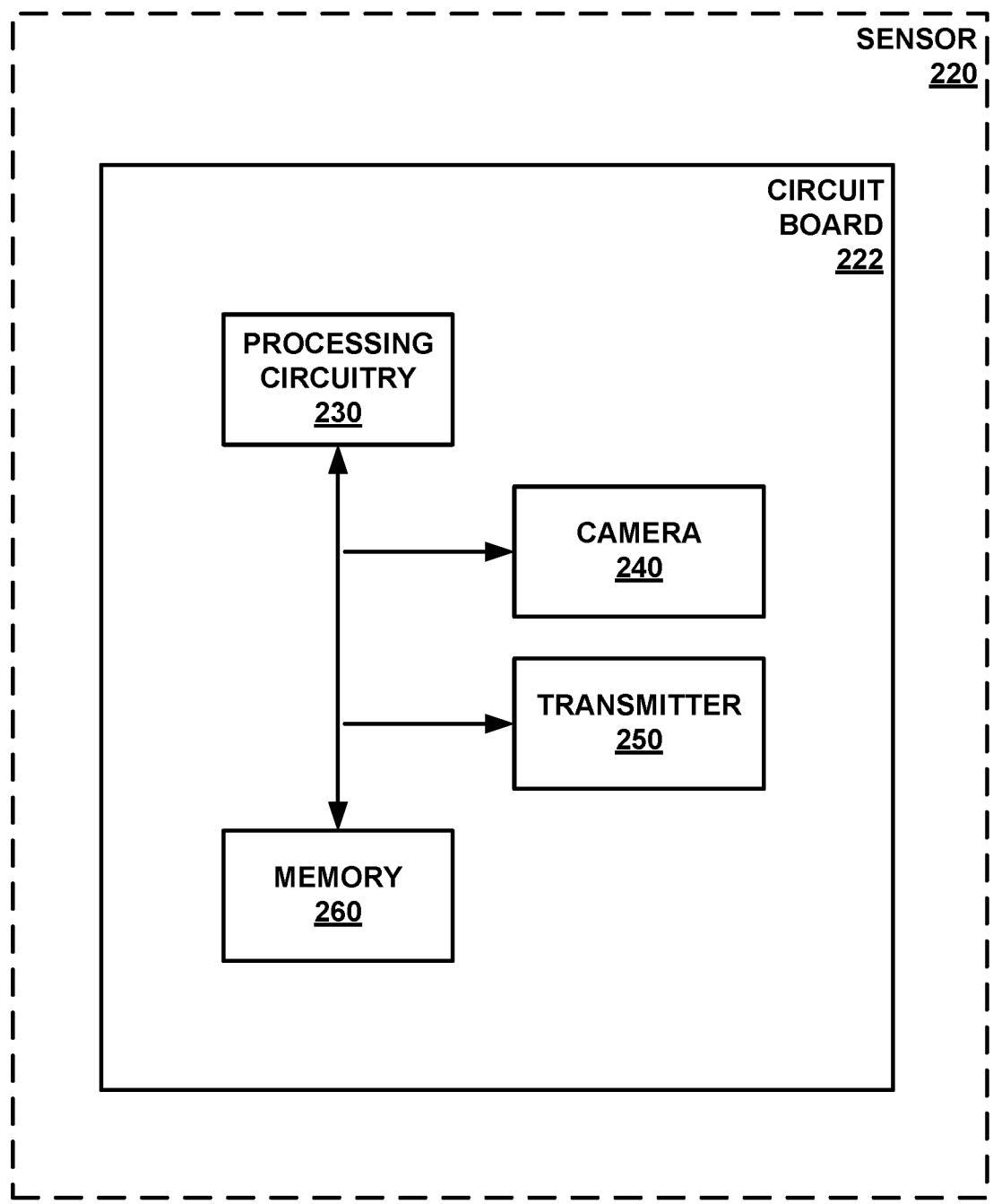
FIG. 2 is a conceptual block diagram of a sensor including processing circuitry and a camera coupled to a circuit board, in accordance with some examples of this disclosure.

FIG. 2 is a conceptual block diagram of a sensor 220 including processing circuitry 230 and a camera 240 coupled to a circuit board 222, in accordance with some examples of this disclosure. Sensor 220 includes circuit board 222, processing circuitry 230, camera 240, wireless transmitter 250, and memory 260. Each of the components of sensor 220 may be coupled to circuit board 222 through mounting, soldering, through-hole connections, wires, leads, pins, and/or any other coupling means. For example, each of processing circuitry 230, wireless transmitter, and memory 260 may include a semiconductor package configured to mount on circuit board 222. Camera 240 may be coupled to circuit board 222 by wires.

The components of sensor 220 may be coupled to single circuit board 222. In some examples, sensor 220 may include additional circuit boards. Circuit board 222 may be positioned at a protrusion of vehicle 200. Circuit board 222 may include a printed circuit board (PCB), a wiring board, a breadboard, and/or any other board for electronic components. In some examples, camera 240 is remote from circuit board 222, such as where camera 240 is mounted on a protrusion or corner of a vehicle, and camera 240 transmits captured images to a remote system (e.g., a cockpit system, a dashboard system, a vehicle control system, or the like). Camera 240 may be configured to stream images to the remote system.

Memory 260 may be configured to store images, distances between an object and camera 240, distances between an object and a point on a vehicle, positions and velocities of an object, threshold levels, speeds of the vehicle, estimated times to collision, and/or any other data. In some examples, memory 260 may store program instructions, which may include one or more program modules, which are executable by processing circuitry 230. When executed by processing circuitry 230, such program instructions may cause processing circuitry 230 to provide the functionality ascribed to it herein. The program instructions may be embodied in software, firmware, and/or RAMware. Memory 260 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Sensor 220 may be mounted on a portion of vehicle, such as the nose, wingtip, or tail of an aircraft. In some examples, processing circuitry 230 can perform image processing for the images captured by camera 240 to determine the position and velocity of an object within the field of view of camera 240. Processing circuitry 230 can then cause transmitter 250 to send the determined position and velocity to a control center of the vehicle. Additionally or alternatively, processing circuitry 230 can cause transmitter 250 to send the captured images to the control center of the vehicle, where the processing circuitry of the control center can perform the image processing.

Figure 3:
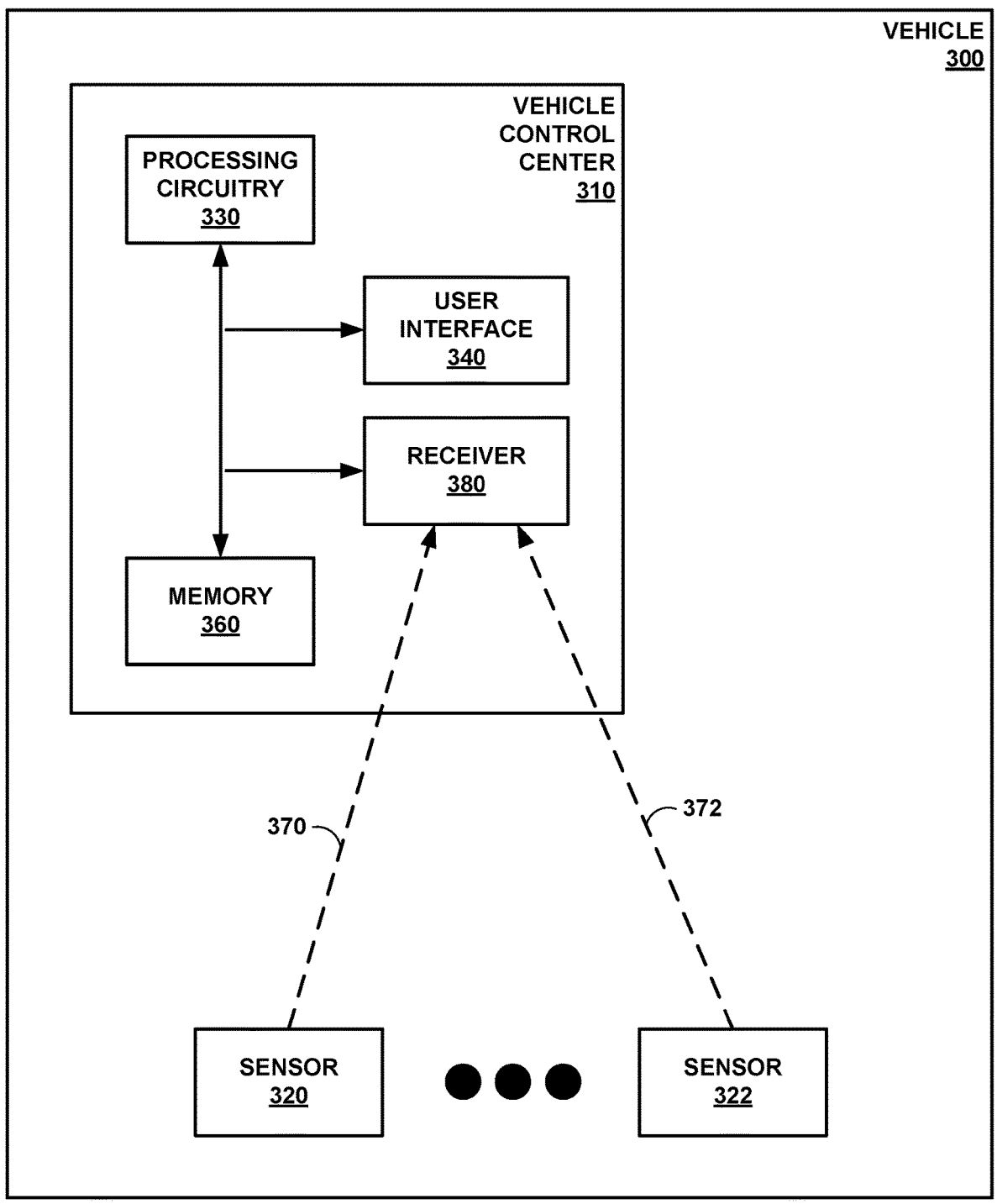
FIG. 3 is a conceptual block diagram of a vehicle control center including a receiver configured to receive data from sensors, in accordance with some examples of this disclosure.

FIG. 3 is a conceptual block diagram of a vehicle control center 310 including a receiver 380 configured to receive data 370 and 372 from sensors 320 and 322, in accordance with some examples of this disclosure. Sensors 320 and 322 are examples of cameras 120 or 122 or sensor 220 that are configured to capture images, determine distances based on the images, and output data 370 and 372.

Vehicle control center 310 can include the cockpit of an aircraft, the avionics bay of an aircraft, the bridge of a marine vehicle, the digital instrument panel of vehicle 300, the engine control unit of vehicle 300, and/or any other operator controls for vehicle 300. In some examples, processing circuitry 330, user interface 340, memory 360, and/or receiver 380 can be positioned partially or fully outside of vehicle control center 310.

Processing circuitry 330 may be configured to decode signals received by receiver 380. Processing circuitry 330 can also receive user inputs via user interface 340. Processing circuitry 330 can cause user interface 340 to present data 370 and 372 to a user. For example, processing circuitry 330 can present a visual indication of the position or velocity of an object or the distance between an object and a point on vehicle 300. Processing circuitry 330 can also present a visual indication (e.g., text and/or number) of an estimated time to collision between the object and vehicle 300. In some examples, processing circuitry 330 generates a graphical user interface that includes a graphical representation of vehicle 300 and a graphical representation of the object. The positions of the graphical representations on the graphical user interface can indicate the location of the object relative to vehicle 300. Thus, processing circuitry 330 can present visual indications of the current and/or future position of vehicle 300 and the object.

User interface 340 may be configured to present information to a user (e.g., a vehicle operator and/or crewmembers). User interface 340 may include a display configured to present a graphical user interface to a user, which may include information about obstacles. User interface 340 may include a monitor, an electronic flight bag, a primary flight display, a multifunction display, a heads-up display, a heads-down display, cathode ray tube display, a flat panel display such as a liquid crystal (LCD) display, a plasma display, a light emitting diode (LED) display, and/or any other suitable display. User interface 340 may be part of a personal digital assistant, mobile phone, tablet computer, laptop computer, any other suitable computing device, or any combination thereof, with a built-in display or a separate display. User interface 340 may also include means for projecting audio to a user, such as speaker(s). Processing circuitry 330 may be configured to present, via user interface 340, a visual, audible, tactile, or somatosensory notification (e.g., an alarm signal) indicative of an obstacle and/or a potential collision.

User interface 340 may include or be part of any suitable device for conveying such information, including a computer workstation, a server, a desktop, a notebook, a laptop, a handheld computer, a mobile device, or the like. In some examples, processing circuitry 330 and user interface 340 may be part of the same device or supported within one housing (e.g., a computer or monitor). In other examples, processing circuitry 330 and user interface 340 may be separate devices configured to communicate through a wired connection or a wireless connection. Based on data 370 and/or 372, user interface 340 may be configured to present information indicating a potential collision between vehicle 300 and an object, such as the estimated time or distance to collision.

Memory 360 may be configured to store data 370 and 372. Memory 360 can also store any other information received by receiver 380 from sensors 320 and 322. Memory 360 can store the GPS location of vehicle 300 and information about the location, speeds, and headings of other vehicles. Vehicle 300 may receive surveillance signals from other vehicle, for example via an automatic-dependent surveillance-broadcast (ADS-B) receiver. The surveillance messages can indicate the position (e.g., latitude and longitude), velocity, and/or type (e.g., make and model, airframe, etc.) of the other vehicle.

Receiver 380 may be configured to receive a wireless signal encoding data 370 from sensor 320. Receiver 380 may be configured to receive a wireless signal encoding data 372 from sensor 322. In some examples, data 370 and 372 includes images captured by cameras in sensors 320 and 322. Additionally or alternatively, receiver 380 can receive processed data such as position and velocity data from sensors 320 and 322. Thus, the image processing function can be performed at sensors 320 and 322 and/or at vehicle control center 310.

Upon receiving data 370 and 372 from sensors 320 and 322, processing circuitry 330 can perform a prediction algorithm and/or image processing algorithm to predict the future positions of vehicle 300 and an object that represents a collision threat. The prediction algorithm may use the current speeds and positions of vehicle 300 and the object, as well as the runway/airport layout. Processing circuitry 330 may be configured to construct or predict the image that the cameras of sensors 320 and 322 would capture if vehicle 300 was in the predicted position and determine if a collision would happen. This prediction can help in alerting the crew of vehicle 300 of a possibility of a collision at a particular position even before vehicle 300 reaches that position. This proactive alerting may result in safe taxiing for vehicle 300.

Figure 4:
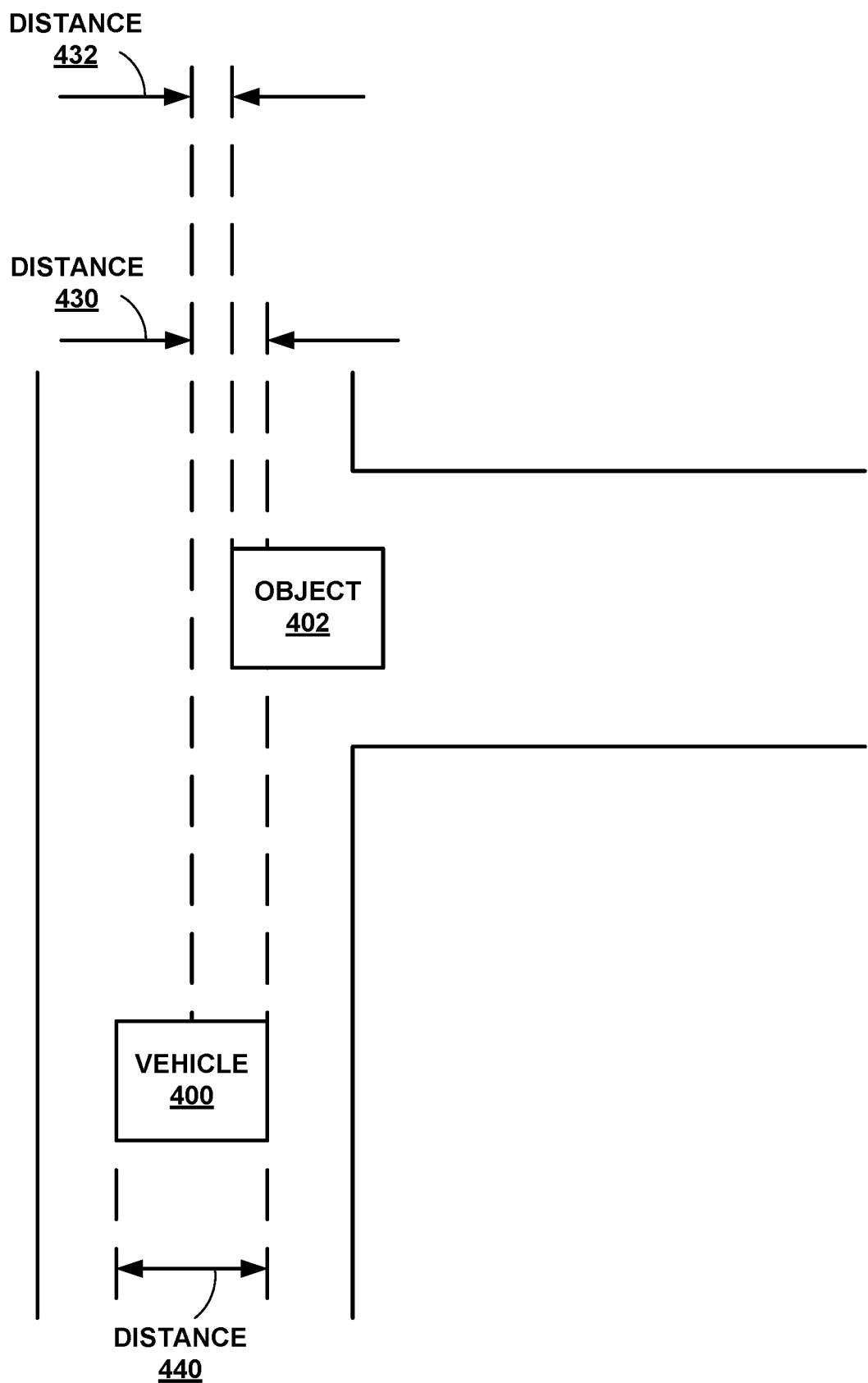
FIGS. 4-6 are conceptual block diagrams of a vehicle detecting an object based on an image captured by a camera onboard the vehicle, in accordance with some examples of this disclosure.
Figure 5:
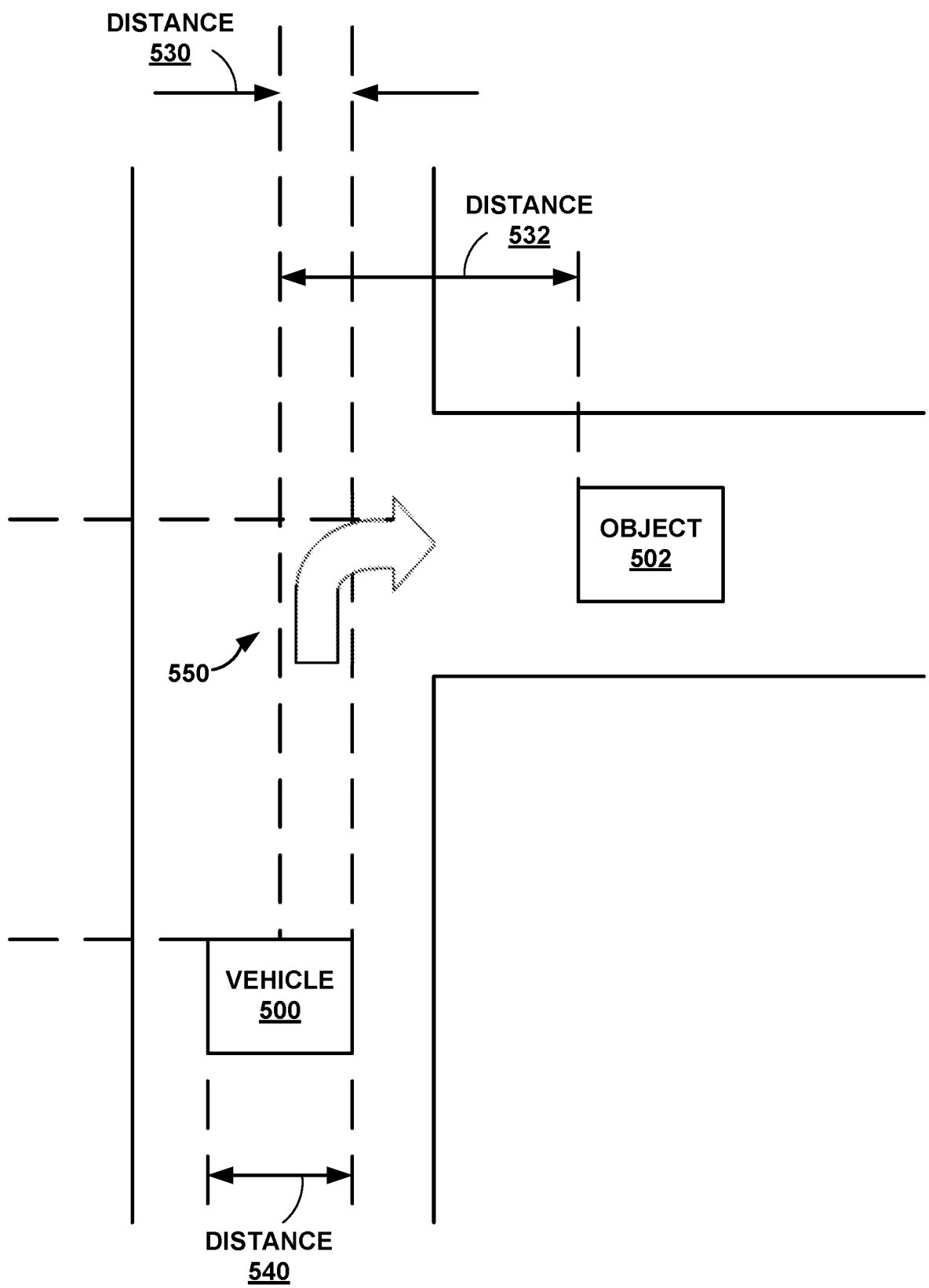
Figure 6:
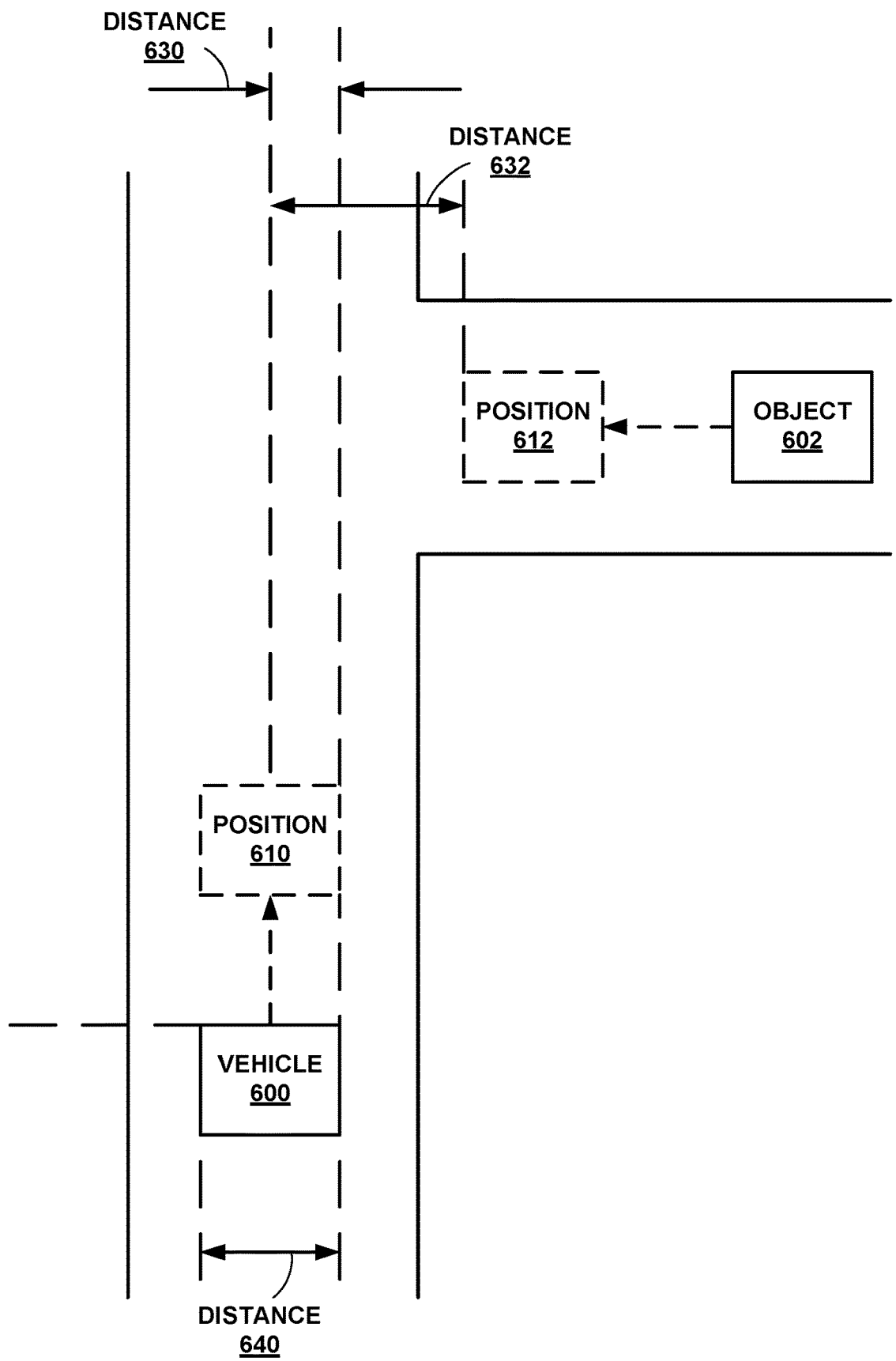

FIGS. 4-6 are conceptual block diagrams of a vehicle detecting an object based on an image captured by a camera onboard the vehicle, in accordance with some examples of this disclosure. In the example of FIG. 4, vehicle 400 includes two or more cameras that can capture images of object 402. Vehicle 400 may include cameras positioned in a nose of vehicle 400 and in one or more wingtips of vehicle 400. The camera positioned in the nose of vehicle 400 may be an EVS camera. The processing circuitry onboard vehicle 400 may be configured to determine the location of object 402 relative to the nose of vehicle 400.

In examples in which object 402 is an aircraft, the camera onboard vehicle 400 can capture an image of the tail, elevator, vertical stabilizer, wing, and/or any other miscellaneous features of object 402. If object 402 is far away and out of the field of view of the camera onboard vehicle 400, the processing circuitry can use the GPS/IRS position of vehicle 400 and the ADS-B position of object to predict a possible collision. The processing circuitry onboard vehicle 400 can determine the relative location and velocity of any of the features of object 402. The processing circuitry can also determine distance 432 based on the captured images, where distance 432 is the distance between the centerline of vehicle 400 and object 402.

The processing circuitry onboard vehicle 400 may be configured to compare distance 432 to distance 430. Distance 430 may be threshold level that represents one half of distance 440, where distance 440 is the wingspan or width of vehicle 400. Distance 432 may be the lateral distance between the centerline and object 402. Distance 430 may be the maximum lateral distance at which a collision is likely if vehicle 400 continues traveling in the same direction and object 402 does not move. Responsive to determining that distance 432 is less than distance 430, the processing circuitry can determine that a collision is likely or imminent. The processing circuitry can generate an alert in response to determining that distance 432 is less than distance 430, and the processing circuitry can cause a wireless transmitter to transmit the alert to a receiver to alert a user such as a vehicle operator or a crewmember.

The processing circuitry may be configured to determine an estimated time to collision between vehicle 400 and object 402 based on the positions of vehicle 400 and object 402, the distance between vehicle 400 and object 402, the velocity of vehicle 400, and/or the velocity of object 402. Responsive to determining that the estimated time to collision is greater than a threshold duration, the processing circuitry may be configured to suppress the transmission of the alert. Responsive to determining that the estimated time to collision is less than a threshold duration, the processing circuitry may be configured to generate an alert. In some examples, vehicle 400 can receive surveillance signals from object 402, where the surveillance signals indicate the position and/or velocity of object 402. The processing circuitry can use the velocity to determine the estimated time to collision or the likelihood of a collision.

Responsive to determining that a distance between vehicle 400 and object 402 is less than a threshold level, processing circuitry in the vehicle control center may be configured to generate an alert, for example, by causing a user interface to flash an annunciation as vehicle 400. The user interface can also present a visual alert, an audible alert, and/or any other kind of alert. For example, the user interface can present a beeping or flashing alert, where the frequency of the beeping or flashing increases as the estimated time to collision decreases. The user interface can increase the frequency of the alert as the distance between vehicle 400 and object 402 decreases.

A collision awareness system of vehicle 400 may be configured to define a confidence factor based on a data source that is used for determining the position of object 402. For example, if object 402 is within a field of view of a first camera mounted on vehicle 400, the system can assign a confidence factor having a first value. If object 402 is within a field of view of a second camera mounted on vehicle 400, the system can assign a confidence factor having a second value. If object 402 is not within a field of view of either camera, the system can determine the position and velocity of object 402 using other means such as surveillance messages received from object 402. The system can assign a confidence factor having a third value in response to determining the position of object 402 using means other than images captured by the cameras mounted on vehicle 400.

The system can use the value of the confidence factor to determine the threshold level for the distance between vehicle 400 and object 402. For more accurate data sources (e.g., a nose camera), the system can use a lower threshold level for the distance between vehicle 400 and object 402. The system can use the confidence factor to determine which sensor or data source should be used by the prediction algorithm. Possible data sources include images captured by cameras mounted on vehicle 400, surveillance messages (e.g., ADS-B), GNSS, and airport/runway layout structures information from the airport moving map (AMM) database. The system can also use the confidence factor to inform the operator or crew on the accuracy of the alert to better prepare the operator or crew for a nearby obstacle.

The threshold level can be determined by the system based on other parameters such as the size of vehicle 400, the speed of vehicle 400, and/or the speed of object 402. Thus, in examples in which the threshold level based on the speed of vehicle 400 and/or object 402, the threshold level represents the time to a possible collision. For example, the system can determine the threshold level by multiplying a threshold time and the velocity of vehicle 400 and/or object 402. Thus, as the speed of vehicle 400 and/or object 402 increases, the system will increase the threshold level accordingly. The system can determine the threshold level based on the size of vehicle 400 and/or the size of object of 402. For example, the system can use a larger threshold level for larger sizes of vehicle 400 and object 402 and can use a smaller threshold level for smaller sizes of vehicle 400 and object 402.

In the example of FIG. 5, vehicle 500 includes two or more cameras that can capture an image of object 502. The cameras may be positioned in a nose or wingtip of vehicle 500, such as a wingtip on a side of vehicle 500 that faces object 502. The processing circuitry that is collocated with the camera may be configured to determine the location of object 502 relative to the wingtip of vehicle 500. The wingtip camera of vehicle 500 may be useful when the field of view of the EVS sensor (e.g., the nose sensor) is not in position or is not sufficient to determine the position of object 502. For example, when vehicle 500 is turning at point 550, and object 502 is stationary or moving at a relatively slow speed. Depending on the visibility and time of the day, the operator and/or crewmembers of vehicle 500 may not notice the presence of object 502. Thus, a sensor mounted on a protrusion of vehicle 500 can help the crew to avoid the collision.

In examples in which object 502 is an aircraft, the camera onboard vehicle 500 can capture an image of the tail, elevator, vertical stabilizer, wing, and/or any other miscellaneous features of object 502. The processing circuitry onboard vehicle 500 can determine the relative location of any of the features of object 502. The processing circuitry can also determine distance 532 based on the captured images, where distance 532 is the distance between the centerline of vehicle 500 and object 502.

The processing circuitry may be configured to compare distance 532 to distance 530. Distance 530 may be threshold level that represents one half of distance 540, where distance 540 is the wingspan or width of vehicle 500. Responsive to determining that distance 532 is greater than distance 530, the processing circuitry may determine that a collision is not likely or imminent. The processing circuitry can also consider the velocity of vehicle 500, the future turn at point 550, and the velocity of object 502 (e.g., determined based on surveillance signals, such as ADS-B signals). The processing circuitry can determine that object 502 has started a turning maneuver based on an image captured by a camera onboard vehicle 500. The processing circuitry can determine the predicted extent of the turning maneuver based on the image and/or a map of the surroundings and determine the future position of object 502 based on the predicted extent of the turning maneuver.

The processing circuitry can generate an alert based on distance 532 and in response to determining that vehicle 500 will turn at point 550 towards object 502. The processing circuitry can be based on the generation of the alert on distance 532 by determining whether distance 532 is less than a second threshold level, which may be based on the velocity of vehicle 500. The processing circuitry can cause a user interface to output the alert to a receiver to alert a user such as an operator or a crewmember of vehicle 500.

Although FIGS. 4 and 5 depict examples of a distance measured from a centerline of vehicles 400 and 500 to objects 402 and 502, other distances can be used. For example, the system onboard a vehicle can determine the distance between the future positions of vehicle 500 and object 502. The system can determine the distance between the future position of object 502 and the future position of a camera that captures an image of object 502. In examples in which object 502 is within a field of view of the nose camera of vehicle 500, the system can determine the distance between the future position of the nose of vehicle 500 and the future position of object 502. The system can use a point on object 502 that is nearest to vehicle 500 or nearest to a camera of vehicle 500. The system can compare the distance to a threshold level to determine the likelihood of a collision between vehicle 500 and object 502.

The processing circuitry may be configured to determine an estimated time to collision between vehicle 500 and object 502 based on distances 532 and 530. Responsive to determining that the estimated time to collision is greater than a threshold duration, the processing circuitry may be configured to suppress the transmission of the alert. Responsive to determining that the estimated time to collision is less than a threshold duration, the processing circuitry may be configured to cause the wireless transmitter to transmit the alert. The processing circuitry collocated with the camera, or other processing circuitry, can use the speed to determine the estimated time to collision or the likelihood of a collision.

Responsive to receiving the alert, the processing circuitry in the vehicle control center may be configured to cause a user interface to flash an annunciation as vehicle 500. The user interface can also present a visual alert, an audible alert, and/or any other kind of alert. For example, the user interface can present a beeping or flashing alert, where the frequency of the beeping or flashing increases as the estimated time to collision decreases. The user interface can also increase the frequency of the alert as the distance between vehicle 500 and object 502 decreases. Presenting the alert to the operator and/or crewmembers of vehicle 500 may help the operator take preventive action.

FIG. 6 is a conceptual block diagram showing the future positions of vehicle 600 and an object 602. A collision awareness system onboard vehicle 600 can determine an estimate of future position 610 for vehicle 600 based on the current position, speed, and/or course of vehicle 600. For example, the system can determine the future latitude of vehicle 600 at position 610 based on the current latitude and a change in latitude ($\Delta$lat), as shown in Equation (1). The system can determine the future longitude of vehicle 600 at position 610 based on the current longitude and a change in longitude ($\Delta$long), as shown in Equation (2). The system can use Equations (3) and (4) to determine future position 612 of object 602.

$$\text{Latitude}_{610} = \text{Latitude}_{600} + \Delta\text{lat}_{ownship} \quad (1)$$

$$\text{Longtude}_{610} = \text{Longitude}_{600} + \Delta\text{long}_{ownship} \quad (2)$$

$$\text{Latitude}_{612} = \text{Latitude}_{602} + \Delta\text{lat}_{object} \quad (3)$$

$$\text{Longtude}_{612} = \text{Longitude}_{602} + \Delta\text{long}_{object} \quad (4)$$

In examples in which the system uses a data source with a low confidence level to determine the position and speed of object 602, the system may assign a low confidence factor to the estimate of future position 612. If the system uses a data source with a high confidence level to determine the position and speed of object 602, the system may assign a high confidence factor to the estimate of future position 612.

The system can use a prediction algorithm to construct an image that the camera onboard vehicle 600 will capture if object 602 moves to future position 612 based on the airport/runway structure and the velocity of object 602 and the field of view of the camera. Using the prediction algorithm, the system can determine the likelihood of a potential collision even before vehicle 600 physically arrives at future position 610.

For example, the system can determine distance 632 between a centerline of vehicle 600 and future position 612 of object 602 and compare distance 632 to a threshold level. The threshold level may be set to distance 630 plus a buffer, where distance 630 is equal to half of the width 640 or wingspan of vehicle 600. Using the prediction algorithm, future positions 610 and 612, the runway/airport layout, the system can predictively alert the crew of a collision. The predictive alerts can help the flight crew of vehicle 600 to be more prepared thus have a safer taxiing.

In examples in which the system determines that a collision will occur based on future positions 610 and 612, then the system can proactively output an alert to the crew of vehicle 600. The alert can indicate information about a potential collision such as the time to collision. For example, the system can inform the crew that a collision may occur in X number of seconds. The system can also inform the crew of the future position where the potential collision is predicted to occur using a user interface (e.g., display) in the vehicle control center. In examples in which the system generates an alert with a low confidence factor, then the system can adjust the intensity of the alerts to inform the crew of the level of uncertainty in the collision prediction.

In some examples, the system can output an indication of the confidence factor or confidence measure in the position or in the collision prediction. For example, the system may output the word "high uncertainty" via a display or audio speaker when the confidence factor is low. The system can also use a color or another visual indication to indicate the confidence level in the collision prediction.

Figure 7:
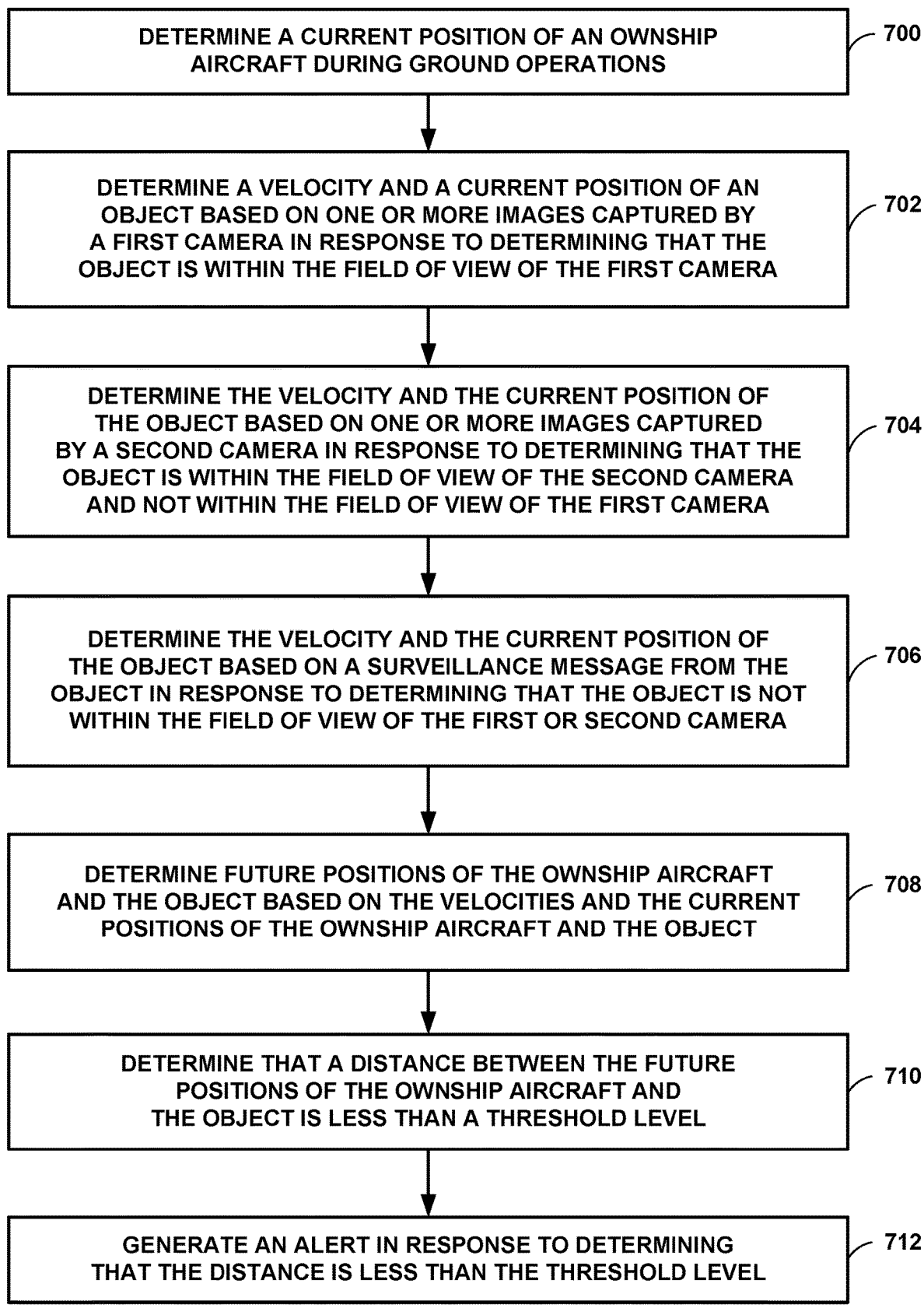
FIGS. 7 and 8 are flowcharts illustrating example processes for predicting a collision between an ownship aircraft and another aircraft during ground operations, in accordance with some examples of this disclosure.
Figure 8:
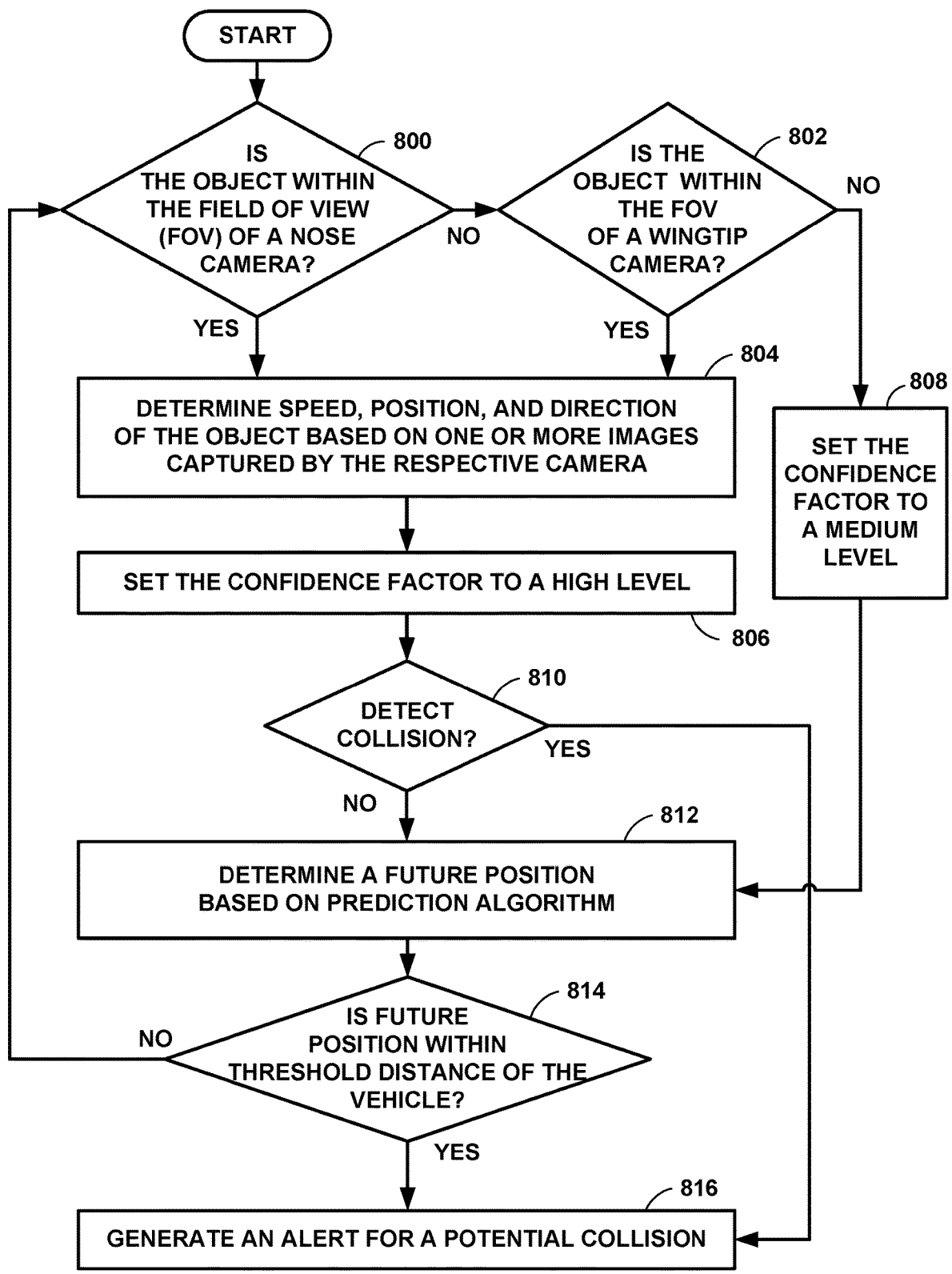

FIGS. 7 and 8 are flowcharts illustrating example processes for predicting a collision between an ownship aircraft and another aircraft during ground operations, in accordance with some examples of this disclosure. The example processes of FIGS. 7 and 8 are described with reference to processing circuitry 180 shown in FIG. 1, although other components may exemplify similar techniques.

In the example of FIG. 7, processing circuitry 180 determines a current position of vehicle 100 during ground operations (700). Processing circuitry 180 can use GNSS to determine the absolute position of vehicle 100 (e.g., latitude and longitude). Additionally or alternatively, can processing circuitry 180 can determine the position of vehicle 100 relative to another object, such as object 102 or a landmark.

In the example of FIG. 7, processing circuitry 180 determines the velocity and current position of object 102 based on one or more images captured by camera 124 in response to determining that object 102 is within field of view 154 of camera 124 (702). Processing circuitry 180 determines the velocity and current position of object 102 based on one or more images captured by camera 122 in response to determining that object 102 is within field of view 152 of camera 122 and not within field of view 154 (704). In the example of FIG. 7, camera 124 is the primary camera in the hierarchy of cameras, but in other examples camera 120, 122, and/or 126 could be the primary camera(s) in the hierarchy.

In some examples, some or all of cameras 120, 122, 124, and 126 may include co-located processing circuitry configured to determine the current position and/or velocity of object 102 based on images captured by the respective camera when object 102 is within the field of view of the respective camera. The co-located processing circuitry may be configured to also determine the distance between vehicle 100 and object 102 and/or an expected time to collision based on images captured by the respective camera when object 102 is within the field of view of the respective camera. The co-located processing circuitry can cause a co-located transmitter to send the position of object 102, the velocity of object 102, the distance between vehicle 100 and object 102, the expected time to collision, and/or the captured images to a vehicle control center. Performing image processing with processing circuitry that is co-located with a camera can reduce the amount of data that is transmitted to the vehicle control center.

In the example of FIG. 7, processing circuitry 180 determines the velocity and current position of object 102 based on a surveillance message from object 102 in response to determining that object 102 is not within field of view 152 or 154 (706). Vehicle 100 can receive surveillance messages from object 102, where the surveillance messages indicate the position and/or velocity of object 102. Processing circuitry 180 can determine that object 102 is in the proximity of vehicle 100 based on images captured by cameras 120, 122, 124, or 126, surveillance messages, radar returns, or any other means. Once processing circuitry 180 has determined that object 102 is proximate vehicle 100, processing circuitry 180 can check the images captured by the primary camera (e.g., camera 124). In response to determining that object 102 is not shown (fully or partially) in the images captured by the primary camera, processing circuitry 180 can check the images captured by a secondary camera (e.g., camera 120, 122, and/or 126).

Processing circuitry 180 can determine the position and velocity of object 102 based on the captured images and/or surveillance messages. For example, processing circuitry 180 can cross-check the position and velocity of object 102 determined from images with the position and velocity indicated in surveillance messages received from object 102. Processing circuitry 180 can also determine the heading and/or course of object 102 based on the images. Processing circuitry 180 may be configured to determine the type of object 102, such as the size, airframe, model, and dimensions based on images and/or surveillance messages. For example, a surveillance message received from object 102 may indicate that object 102 is a Boeing 737 manufactured by Boeing Company of Chicago, Ill. Processing circuitry 180 can query a database to determine the dimensions (e.g., length and wingspan) of a Boeing 737, where processing circuitry 180 can use the dimensions of object 102 in predicting a potential collision between vehicle 100 and object 102.

In the example of FIG. 7, processing circuitry 180 determines future positions of vehicle 100 and object 102 based on the velocities and current position of vehicle 100 and object 102 (708). Processing circuitry 180 can extrapolate the current velocities ahead for a period of time. Additionally or alternatively, processing circuitry 180 can assume that object 102 will stop at a certain location such as the current position of object 102 or a position just ahead of object 102. Processing circuitry 180 then determines whether a distance between the estimated future positions of vehicle 100 and object 102 is less than a threshold level (710). In some examples, processing circuitry 180 can determine whether distance 170 is less than half of the wingspan 140 or width of vehicle 100, plus a buffer distance to ensure a safe clearance.

In the example of FIG. 7, processing circuitry 180 generates an alert in response to determining that the distance is less than the threshold level (712). Processing circuitry 180 can output the alert to the operator and/or crew of vehicle 100 as a visual alert, audible alert, and/or any other type of alert. Processing circuitry 180 can suppress generation of the alert in response to determining that the distance is not less than the threshold level.

In the example of FIG. 8, processing circuitry 180 determines whether object 102 is within field of view 154 of nose camera 124 (800). In response to determining that object 102 is not within field of view 154 ("NO" branch of 800), processing circuitry 180 determines whether object 102 is within field of view 152 of wingtip camera 122 (802). In some examples, there may be more than two cameras mounted on vehicle 100 (e.g., cameras 120 and 126). In response to determining that object 102 is within field of view 152 ("YES" branch of 802) or 154 ("YES" branch of 800), processing circuitry 180 determines the speed, position, and direction of object 102 based on images captured by camera 122 or 124 (804). Processing circuitry 180 then sets the confidence factor to a high level to indicate a high level of confidence in the determined position and velocity (806). In response to determining that object 102 is not within field of view 152 or 154 "NO" branch of 802), processing circuitry sets the confidence factor to a medium level (808).

In some examples, processing circuitry 180 can set the confidence factor based on the data source. For example, processing circuitry 180 can set the confidence factor to a first, highest value when camera 124 is used (e.g., when object 102 is within field of view 154). Processing circuitry 180 can set the confidence factor to a second, lower value when camera 120 or 122 is used to determine the position of object 102. Processing circuitry 180 can set the confidence factor to a lowest value when surveillance messages are used to determine the position of object 102. Processing circuitry 180 can generate an audio alert or present a visual alert that is based on the value of the confidence factor. Processing circuitry 180 can vary the characteristics (e.g., tone, color, size, text, and/or frequency) of the alert based on the value of the confidence factor.

In the example of FIG. 8, when the confidence level is set to a high level, processing circuitry 180 determines whether a collision is likely based on determined positions and velocities (810). In response to determining that a collision is likely between vehicle 100 and object 102 ("YES" branch of 810), processing circuitry 180 generates an alert for the potential collision (816). In response to determining that a collision is not likely "NO" branch of 810), processing circuitry 180 determines a future position of object 102 based on a prediction algorithm, including inputs such as AMM, IRS, GPS, and ADS-B (812). If the determined future position of object 102 is within a threshold distance of vehicle 100 ("YES" branch of 814), processing circuitry 180 generates an alert for the potential collision (816). If the determined future position is not within the threshold distance of vehicle 100 "NO" branch of 814), processing circuitry 180 checks the newly captured images for object 102.

The following numbered examples demonstrate one or more aspects of the disclosure.

Example 1. This disclosure describes a method for predicting a collision between an ownship aircraft and an object during ground operations of the ownship aircraft. The collision awareness method includes determining, in a first instance, that the other aircraft is within a field of view of a first camera mounted on a first portion of the ownship aircraft. The method also includes determining, in the first instance and in response to determining that the object is within the field of view of the first camera, a velocity of the object and a current position of the object based on one or more images captured by the first camera. The method further includes determining, in a second instance, that the other aircraft is within a field of view of a second camera mounted on a second portion of the ownship aircraft and not within the field of view of the first camera. The method includes determining, in the second instance and in response to determining that the object is within the field of view of the second camera and not within the field of view of the first camera, the velocity of the object and the current position of the object based on one or more images captured by the second camera. The method also includes determining, in a third instance, that the object is not within the field of view of the first camera or the field of view of the second camera. The method further includes determining, in the third instance and in response to determining that the object is not within the field of view of the first camera or the field of view of the second camera, the current position of the object based on a surveillance message. The method includes determining a future position of the object based on the velocity of the object and the current position of the object. The method further includes determining that a distance between a future position of the ownship aircraft and the future position of the object is less than a threshold level and generating an alert in response to determining that the distance is less than the threshold level.

Example 2. The method of example 1, determining the current position of the second aircraft based on a data source and determining a confidence factor based on the data source.

Example 3. The method of example 2, further including determining the threshold level for the distance based on the confidence factor.

Example 4. The method of examples 1-3 or any combination thereof, further including determining the confidence factor having a first value in response to determining that the second aircraft is within the field of view of the first camera Example 5. The method of examples 1-4 or any combination thereof, further including determining the confidence factor having a second value in response to determining that the second aircraft is not within a field of view of the first camera or the field of view of the second camera, the second value indicating a lower level of confidence than the first value.

Example 6. The method of examples 1-5 or any combination thereof, wherein generating the alert includes generating a first audio alert or presenting a first visual alert based on the confidence factor having the first value and generating a second audio alert or presenting a second visual alert based on the confidence factor having the second value.

Example 7. The method of example 6, where a tone of the second audio alert is different than a tone of the first audio alert.

Example 8. The method of examples 6-7 or any combination thereof, where a color of the second visual alert is different than a color of the first visual alert.

Example 9. The method of examples 1-8 or any combination thereof, further including suppressing generation of the alert in response to determining that the distance is not less than the threshold level.

Example 10. The method of examples 1-9 or any combination thereof, further including receiving the surveillance message from the second aircraft.

Example 11. The method of examples 1-10 or any combination thereof, where the surveillance message indicates the current position of the second aircraft, the velocity of the second aircraft, and a type of the second aircraft.

Example 12. The method of examples 1-11 or any combination thereof, further including determining the threshold level based on a size of the ownship aircraft and further based on a size of the second aircraft.

Example 13. The method of examples 1-12 or any combination thereof, further including determining the size of the second aircraft based on a surveillance message received from the second aircraft.

Example 14. The method of examples 1-13 or any combination thereof, where generating the alert includes presenting the current position of the second aircraft to a flight crew of the aircraft.

Example 15. The method of examples 1-14 or any combination thereof, further including determining a predicted time to collision between the ownship aircraft and the second aircraft.

Example 16. The method of examples 1-15 or any combination thereof, where generating the alert includes presenting the predicted time to collision to a flight crew of the aircraft.

Example 17. The method of examples 1-16 or any combination thereof, further including determining the future position of the second aircraft by determining that the second aircraft has started a turning maneuver based on the one or more images captured by the first camera or the second camera; determining a predicted extent of the turning maneuver based on the one or more images captured by the first camera or the second camera; and determining the future position of the second aircraft based on the predicted extent of the turning maneuver.

Example 18. A collision awareness system can predict a collision between an ownship aircraft and an object during ground operations. The collision awareness system including a first camera mounted on a first portion of the ownship aircraft and a second camera mounted on a second portion of the ownship aircraft. The collision awareness system also includes processing circuitry configured to, in response to determining that the object is within a field of view of the first camera, determine a velocity of the object and a current position of the object based on one or more images captured by the first camera. The processing circuitry is also configured to, in response to determining that the object is within a field of view of the second camera and not within the field of view of the first camera, determine the velocity of the object and the current position of the object based on one or more images captured by the second camera. The processing circuitry is further configured to, in response to determining that the object is not within the field of view of the first camera or the field of view of the second camera, determine the current position of the object based on a surveillance message. The processing circuitry is configured to determine a future position of the object based on the velocity of the object and the current position of the object. The processing circuitry is also configured to determine that a distance between a future position of the ownship aircraft and the future position of the object is less than a threshold level and generate an alert in response to determining that the distance is less than the threshold level.

Example 19. The collision awareness system of example 18, wherein the processing circuitry is configured to perform the method of examples 1-17 or any combination thereof.

Example 20. A device includes a computer-readable medium having executable instructions stored thereon, configured to be executable by processing circuitry for causing the processing circuitry to perform the collision awareness method of examples 1-17 or any combination thereof.

Example 21. A system includes means for performing the collision awareness method of examples 1-17 or any combination thereof.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to cameras 120, 122, 124, 126, and 240, processing circuitry 180, 230, and 330, memory 260 and 360, sensors 320 and 322, and/or user interface 340, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between cameras 120, 122, 124, 126, and 240, processing circuitry 180, 230, and 330, memory 260 and 360, sensors 320 and 322, and/or user interface 340. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, cameras 120, 122, 124, 126, and 240, processing circuitry 180, 230, and 330, memory 260 and 360, sensors 320 and 322, and/or user interface 340, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A collision awareness system for predicting a collision between an ownship aircraft and a second aircraft during ground operations, the collision awareness system comprising:
 a first camera mounted on a first portion of the ownship aircraft;
 a second camera mounted on a second portion of the ownship aircraft; and
 processing circuitry configured to:
  determine a current position of the second aircraft based on a data source comprising one or more of the first camera, the second camera, or an aircraft surveillance system by at least:
   determining that the second aircraft is within a field of view of the first camera;
   in response to determining that the second aircraft is within the field of view of the first camera, determining a velocity of the second aircraft and a current position of the second aircraft based on one or more images captured by the first camera;
   determining that the second aircraft is within a field of view of the second camera and not within the field of view of the first camera;
   in response to determining that the second aircraft is within the field of view of the second camera and not within the field of view of the first camera, determining the velocity of the second aircraft and the current position of the second aircraft based on one or more images captured by the second camera;
   determining that the second aircraft is not within the field of view of the first camera or the field of view of the second camera; and
   in response to determining that the second aircraft is not within the field of view of the first camera or the field of view of the second camera, determining the current position of the second aircraft based on a received surveillance message, via the aircraft surveillance system, from the second aircraft;
  determine a confidence factor based on the data source used to determine the current position by at least:

determining the confidence factor having a first value in response to determining that the second aircraft is within the field of view of the first camera; and determining the confidence factor having a second value in response to determining that the second aircraft is not within the field of view of the first camera or the field of view of the second camera, the second value indicating a lower level of confidence than the first value;

determine a threshold level for a distance between a future position of the ownership aircraft and a future position of the second aircraft based on the confidence factor;

determine the future position of the second aircraft based on the velocity of the second aircraft and the current position of the second aircraft;

determine that the distance is less than the threshold level; and generate an alert in response to determining that the distance is less than the threshold level.

2. The collision awareness system of claim 1, wherein the processing circuitry is further configured to generate the alert by:

generating a first audio alert or presenting a first visual alert based on the confidence factor having the first value; and generating a second audio alert or presenting a second visual alert based on the confidence factor having the second value, a tone of the second audio alert being different than a tone of the first audio alert, and a color of the second visual alert being different than a color of the first visual alert.

3. The collision awareness system of claim 1, wherein the processing circuitry is further configured to suppress generation of the alert in response to determining that the distance is not less than the threshold level.

4. The collision awareness system of claim 1, wherein the processing circuitry is configured to receive the surveillance message from the second aircraft, and wherein the surveillance message indicates the current position of the second aircraft, the velocity of the second aircraft, and a type of the second aircraft.

5. The collision awareness system of claim 1, wherein the processing circuitry is further configured to determine the threshold level based on a size of the ownship aircraft and further based on a size of the second aircraft.

6. The collision awareness system of claim 5, wherein the processing circuitry is further configured to determine the size of the second aircraft based on a surveillance message received from the second aircraft.

7. The collision awareness system of claim 1, wherein the processing circuitry includes:

first processing circuitry colocated with the first camera on the first portion of the ownship aircraft;

second processing circuitry colocated with the second camera on the second portion of the ownship aircraft; and third processing circuitry located in a cockpit of the ownship aircraft, wherein the first processing circuitry is configured to:

determine the current position of the second aircraft based on one or more images captured by the first camera in response to determining that the second aircraft is within the field of view of the first camera; and cause a first transmitter colocated with the first camera to transmit the current position of the second aircraft to the third processing circuitry, and wherein the second processing circuitry is configured to:

determine the current position of the second aircraft based on one or more images captured by the second camera in response to determining that the second aircraft is within the field of view of the second camera; and cause a second transmitter colocated with the second camera to transmit the current position of the second aircraft to the third processing circuitry.

8. The collision awareness system of claim 1, wherein the processing circuitry is configured to generate the alert by presenting the current position of the second aircraft to a flight crew of the aircraft.

9. The collision awareness system of claim 1, wherein the processing circuitry is further configured to determine a predicted time to collision between the ownship aircraft and the second aircraft, and wherein the processing circuitry is configured to generate the alert by presenting the predicted time to collision to a flight crew of the aircraft.

10. The collision awareness system of claim 1, wherein the processing circuitry is configured to determine the future position of the second aircraft by:

determining that the second aircraft has started a turning maneuver based on the one or more images captured by the first camera or the second camera;

determining a predicted extent of the turning maneuver based on the one or more images captured by the first camera or the second camera; and determining the future position of the second aircraft based on the predicted extent of the turning maneuver.

11. A collision awareness method for predicting a collision between an ownship aircraft and a second aircraft during ground operations, the collision awareness method comprising:

determining, in a first instance, that the second aircraft is within a field of view of a first camera mounted on a first portion of the ownship aircraft;

determining, in the first instance and in response to determining that the second aircraft is within the field of view of the first camera, a velocity of the second aircraft and a current position of the second aircraft based on one or more images captured by the first camera;

determining, in a second instance, that the other aircraft is within a field of view of a second camera mounted on a second portion of the ownship aircraft and not within the field of view of the first camera;

determining, in the second instance and in response to determining that the second aircraft is within the field of view of the second camera and not within the field of view of the first camera, the velocity of the second aircraft and the current position of the second aircraft based on one or more images captured by the second camera;

determining, in a third instance, that the second aircraft is not within the field of view of the first camera or the field of view of the second camera;

determining, in the third instance and in response to determining that the second aircraft is not within the field of view of the first camera or the field of view of the second camera, the current position of the second aircraft based on a received surveillance message from the second aircraft via an aircraft surveillance system;

determining a confidence factor based on a data source used to determine the current position of the second aircraft, the data source comprising one or more of the first camera, the second camera, or the aircraft surveillance system, wherein determining the confidence factor comprises:

determining the confidence factor having a first value in response to determining that the second aircraft is within the first field of view of the first aircraft; and determining the confidence factor having a second value in response to determining that the second aircraft is not within the field of view of the first camera or the field of view of the second camera, the second value indicating a lower level of confidence than the first value;

determining a threshold level for a distance between a future position of the ownship aircraft and a future position of the second aircraft based on the confidence factor;

determining the future position of the second aircraft based on the velocity of the second aircraft and the current position of the second aircraft;

determining that the distance is less than the threshold level; and generating an alert in response to determining that the distance is less than the threshold level.

12. The collision awareness method of claim 11, further comprising suppressing generation of the alert in response to determining that the distance is not less than the threshold level.

13. The collision awareness method of claim 11, further comprising:

receiving the surveillance message from the second aircraft, wherein the surveillance message indicates the current position of the second aircraft, the velocity of the second aircraft, and a type of the second aircraft; and determining the threshold level based on a size of the ownship aircraft and further based on the size of the second aircraft.

14. The collision awareness method of claim 11, further comprising determining a predicted time to collision based on the current position of the ownship aircraft and the current position of the second aircraft, wherein generating the alert comprises presenting the predicted time to collision to a flight crew of the aircraft.

15. A collision awareness system for predicting a collision between an ownship aircraft and an object during ground operations, the collision awareness system comprising:

a first camera mounted on a first portion of the ownship aircraft;

a second camera mounted on a second portion of the ownship aircraft; and processing circuitry configured to:

determine that the object is within a field of view of the first camera;

determine a current position of the object based on one or more images captured by the first camera in response to determining that the object is within the field of view of the first camera;

determine that the object is within a field of view of the second camera and not within the field of view of the first camera;

determine the current position of the object based on one or more images captured by the second camera in response to determining that the object is within the field of view of the second camera and not within the field of view of the first camera;

determine a confidence factor based on a data source comprising one or more of the first camera, the second camera, or surveillance messages from an aircraft surveillance system by at least:

determining the confidence factor having a first value in response to determining that the second aircraft is within the field of view of the first camera; and determining the confidence factor having a second value in response to determining that the second aircraft is not within the field of view of the first camera or the field of view of the second camera, the second value indicating a lower level of confidence than the first value;

determine a threshold level for a distance between the ownship aircraft and the object based on the confidence factor;

determine that a distance between a future position of the ownship aircraft and the current position of the object is less than the threshold level; and generate an alert in response to determining that the distance is less than the threshold level.

* * * * *